(12) United States Patent
Plutshack

(10) Patent No.: US 9,422,514 B2
(45) Date of Patent: Aug. 23, 2016

(54) POINT-OF-PRODUCTION BREWING SYSTEM

(76) Inventor: Mark Plutshack, Menomonee Falls, WI (US)

( * ) Notice: Subject to any disclaimer, the term of this patent is extended or adjusted under 35 U.S.C. 154(b) by 1037 days.

(21) Appl. No.: 13/403,748

(22) Filed: Feb. 23, 2012

(65) Prior Publication Data

US 2013/0220133 A1 Aug. 29, 2013

(51) Int. Cl.
| | | |
|---|---|---|
| C12C 7/14 | (2006.01) | |
| C12C 11/00 | (2006.01) | |
| C12C 13/00 | (2006.01) | |
| C12C 7/00 | (2006.01) | |

(52) U.S. Cl.
CPC . *C12C 13/00* (2013.01); *C12C 7/00* (2013.01); *C12C 11/00* (2013.01)

(58) Field of Classification Search
CPC ............ C12C 7/00; C12C 11/00; C12C 13/00
USPC ............................................ 99/276, 278, 277
See application file for complete search history.

(56) References Cited

U.S. PATENT DOCUMENTS

| 4,494,451 | A | * | 1/1985 | Hickey | ............................. 99/276 |
| 5,718,161 | A | * | 2/1998 | Beadle | .............. 99/276 |
| 8,528,463 | B2 | * | 9/2013 | Hallberg et al. | ................ 99/275 |
| 2009/0148556 | A1 | * | 6/2009 | Stippler et al. | .................. 426/16 |
| 2011/0274785 | A1 | * | 11/2011 | Boyce et al. | ..................... 426/13 |
| 2012/0000367 | A1 | * | 1/2012 | Michel et al. | .................... 99/276 |
| 2012/0070535 | A1 | * | 3/2012 | Kamil | ............................. 426/16 |

FOREIGN PATENT DOCUMENTS

EP 87139 * 8/1983

* cited by examiner

*Primary Examiner* — Reginald L Alexander
(74) *Attorney, Agent, or Firm* — Andrus Intellectual Property Law, LLP

(57) ABSTRACT

A point-of-production brewing system which utilizes commercially available ocean and over-the-road shipping containers as a means to create a modular brewing system. Point-of-production brewing system is comprised of a system of modules for transporting and producing an alcoholic beverage and includes a wort production equipment module, a fermentation/maturation equipment module and a packaging module. The modular design allows for the system to be rapidly deployed and utilized to produce an alcoholic beverage on site.

16 Claims, 9 Drawing Sheets

POINT-OF-PRODUCTION BREWING SYSTEM

FIELD OF INVENTION

The present invention relates to the field of alcoholic beverage manufacture, and more specifically to a point-of-production brewing system which can be pre-configured, adapted and transported to a single or multiple points of production and installed intact for brewery operation.

BACKGROUND

Figure 1:
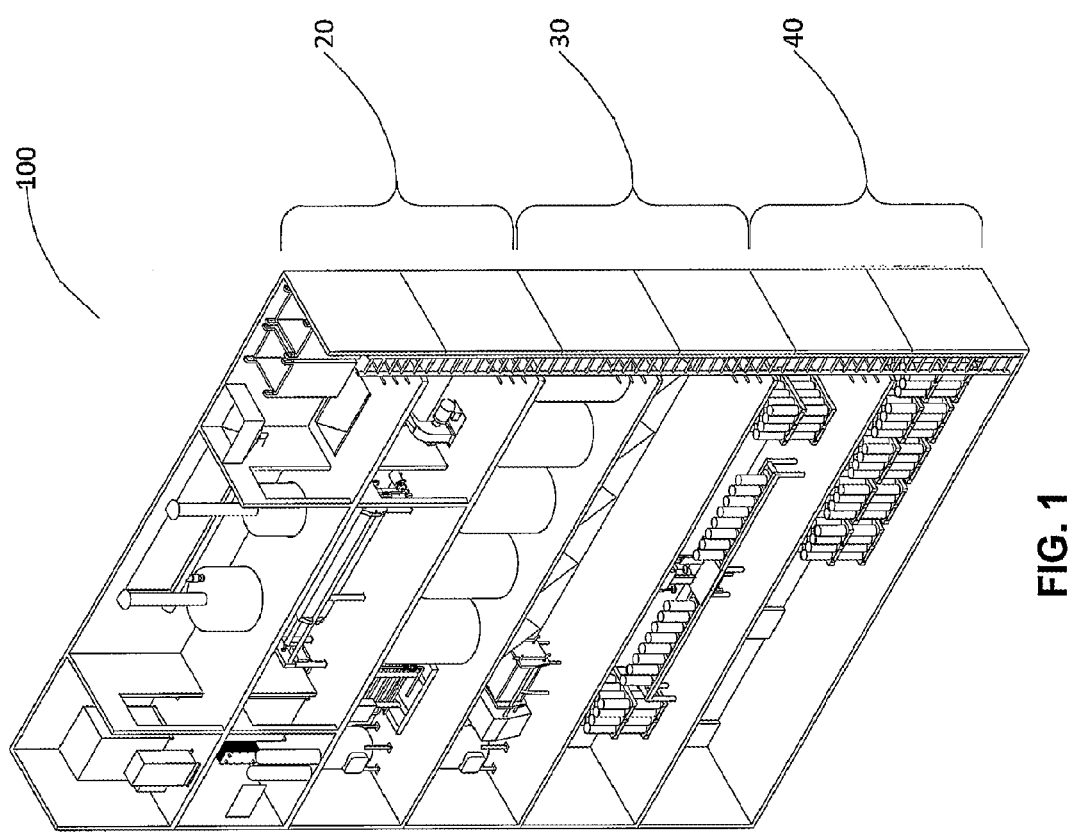
FIG. 1 illustrates an exemplary embodiment of a point-of-production brewing system which is comprised of multiple brewing modules having discrete brewing functions.

Craft breweries, pub breweries and beverage manufacturing facilities have become increasingly popular in recent years with the decrease in demand for larger national producers. More and more, beer drinkers are looking for a better taste and a higher quality beer which the leading industry suppliers are not producing.

The New Brewer Magazine is a publication produced by a national U.S. based organization. According to its Jun. 11, 2011 issue and other coverage, 600 breweries are currently in the planning stages. Only ninety-seven new "craft" breweries opened in 2010. Most craft brewers distribute through local distribution outlets. One factor that leads to the economics decision to produce and sell locally is the relatively short shelf life of the beer.

Currently, the industry is dominated by InBev, a South African company that is a subsidiary Anheuser-Busch. InBev currently sells more than 100 million barrels a year, with retail of as much as $400 per barrel. This relatively "untapped" market presents tremendous opportunity for "craft" brewers who can capture even hundredths of a percentage of national the market.

Breweries and brew pubs typically require a permanent building facility. Initial capital costs to start a brewery range anywhere from $200,000 to millions. Craft breweries and pub breweries are comprised of brewing specific or related industry equipment which must be purchased and assembled at an existing site or newly built site.

A major problem in the brewing industry is the cost of establishing a brewery; typical buildings are not designed for optimal usage of the equipment or the surroundings for the effective production and promotion of the product. Further, often times many costly modifications must be made to the equipment or the building facility to achieve optimal functionality of the equipment. Likewise, the costs of labor, consultation, set up, adjustment, calibration and utilities also increase the price of establishing a brewery.

Another problem known in art is the large foot print a typical brewery creates. Brewery equipment is large and may span across an entire building or warehouse. Further, it is common in the craft beer industry to expand once a product becomes more recognized and demanded. Currently, brewery owners have no choice but to expand their permanent structures or relocate the entire brewery itself. Due to building restrictions, expanding permanent structures may be extremely difficult and costly.

Another problem known in the art is how brewery and brew pub owners are restricted from relocating. Many owners may desire to relocate or move their brewery or pub to another location for better markets. However, the option of relocating an entire brewery is virtually impossible because of the permanent structure and equipment set up. Moving an entire brewery would require the same cost as starting a new one.

Therefore a need exists for a cheaper and more easily established brewing system that does not require expensive modifications or equipment installation. Further, a need exists for a brewing system which is already calibrated and installed to eliminate or decrease the costs of labor, installation and consultation.

Moreover, a need exists for a modular brewing system which may be shipped, transported, or relocated without expensive repairs and moving costs. Further, a need exists for a brewing system which allows for easy and rapid expansion to output more product without having to pay for costly modifications to an existing structure.

A need exists for a brewing system which is pre-fabricated and pre-installed with inter-connecting piping and electrical connects as well as pre-testing.

TERMS OF ART

As used herein, the term "blending system" means structurally integrated equipment within a POP brewing system which blends water into an alcoholic beverage, typically after the alcoholic beverage leaves the fermentation/maturation vessels.

As used herein, the term "brewing module" means a functionally integrated set of brewing components housed within a single housing structure. Brewing modules may include but are not limited to a wort production module, a fermentation/maturation module, a packaging/storage module, and a utility module.

As used herein "carbonation system" means structurally integrated equipment which supplies forced carbonation to the alcoholic beverage at a later stage in the brewing process, typically after the beverage leaves the fermentation tank, and which further includes a back pressure valve.

As used herein, the term "cleaning-in-place system" or "CIP system" means structurally integrated equipment for the use of chemical, temperature, and/or turbulent cleaning and sanitizing of product contact surfaces.

As used herein, the term "fermentation/maturation equipment module" or "FME module" means an integrated unit within a POP brewing system comprised of structurally integrated equipment within a housing to effect fermentation and initial stage carbonation.

As used herein, the term "filtration system" means structurally integrated equipment within a POP brewing system used to filter particulate and other matter from a liquid, including but not limited to coarse, fine, centrifuge, depth, kenall, de filter, plate and frame, sterile filters and combinations thereof.

As used herein, the term "grist hydrator" means equipment for hydrating cracked grain or other fermentable raw materials which fermentable sugars may be obtained from.

As used herein, the term "housing" means a structure which encloses brewing machinery and components, and be comprised of any six-sided structure, or configuration of six sided structure, which are adapted from shipping and containment use.

As used here, the term "mash conversion vessel" means structurally integrated equipment where starches are converted to fermentable sugars.

As used herein, the term "mash conversion filter" means equipment which separates liquid wort from solid materials and may also include a lauter tun.

As used herein, the term "packaging module" or "PM" means a structurally integrated for packaging a beverage into a container including but not limited to cans, bottles and kegs.

As used herein, the term "point-of-production brewing system" or "POP brewing system" means a brewing system and integrated brewing components that can be transported and used at a user-selected location without an existing structure, or as part of an existing structure or as a component within an existing structure, with minimal accommodation for the placement, implementation or operation.

As used here, the term "trub separation vessel" means structurally integrated equipment where wort is heated and/or trub separation occurs.

As used herein, the term "utility module" or "brewery support equipment" means a module which may include but is not limited to a heating and cooling water system, gas supply, compressed air supply, water deaeration, water treatment and CIP system.

As used herein, the term "water treatment system" means a pre and post treatment of water used in the brewing process.

As used herein, the term "wort" means the liquid extracted from the mashing process which contains fermentable sugars.

As used herein, the term "wort production equipment module" or "WPE module" means an integrated unit within a POP brewing system which contains structurally integrated equipment to convert malted barley or other raw materials to a fermentable sugar solution.

As used herein, the term "yeast brink" means equipment necessary for the storage and/or propagation and management of yeast.

SUMMARY OF THE INVENTION

The present invention is a point-of-production brewing system which is comprised of a system of modules for transporting and producing an alcoholic beverage and includes a wort production equipment module, a fermentation/maturation equipment module and a packaging module. The modular design allows for the system to be rapidly deployed and utilized to produce an alcoholic beverage on site. The wort production equipment module converts raw materials or malted extract to a fermentable liquid known as wort. Fermentation/maturation equipment module converts the wort into an alcoholic beverage and packaging module is comprised of necessary equipment to bottle and store the alcoholic beverage for distribution purposes. Equipment and systems within each module are operatively and structurally integrated for a complete brewing facility.

DETAILED DESCRIPTION OF INVENTION

For the purpose of promoting an understanding of the present invention, references are made in the text to exemplary embodiments of a point-of-production brewing system, only some of which are described herein. It should be understood that no limitations on the scope of the invention are intended by describing these exemplary embodiments. One of ordinary skill in the art will readily appreciate that alternate but functionally equivalent shapes, materials and designs may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates an exemplary embodiment of point-of-production ("POP") brewing system 100. In the exemplary embodiment shown, POP brewing system 100 is comprised of three main brewing modules: wort production equipment ("WPE") module 20; fermentation/maturation equipment ("FME") module 30; and packaging module 40. In the embodiment shown, WPE module 20 includes structurally integrated equipment and systems necessary to convert raw materials or malted extract into a fermentable liquid known in the art as wort. FME module 30 includes structurally integrated equipment used to ferment the wort and produce an alcoholic beverage. In the embodiment shown, packaging module 40 includes equipment and systems to package the beverage into containers for distribution and consumption purposes.

POP brewing system 100 uses specifically built and arranged equipment to best utilize the space within each housing and maximize production output. In other embodiments, POP brewing system 100 may include a plurality of modules to create a higher output of a beverage.

Figure 2:
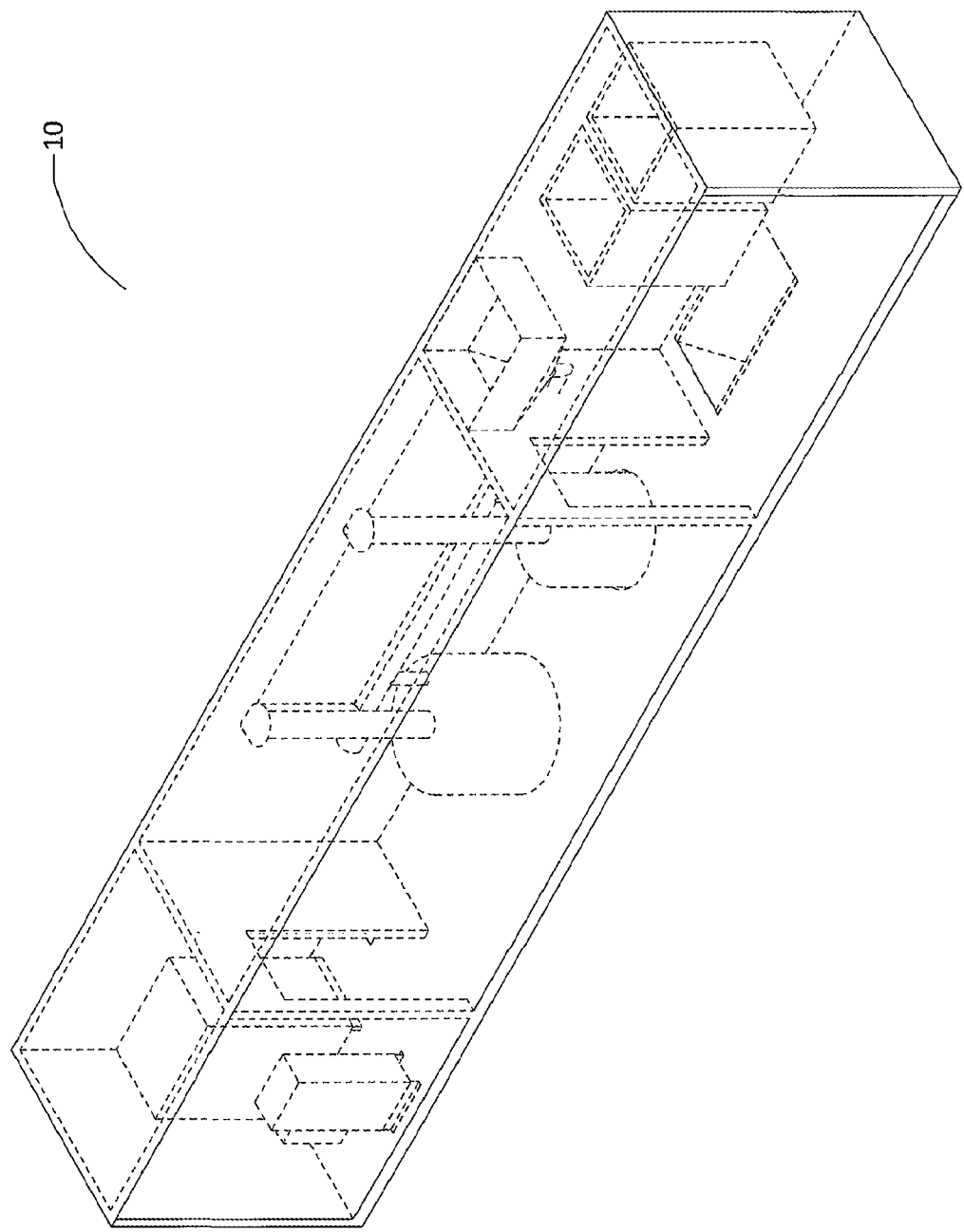
FIG. 2 illustrates an exemplary embodiment a point-of-production brewing system module comprised of equipment and systems which are permanently and structurally integrated within a component building block.

FIG. 2 illustrates an exemplary embodiment a POP brewing system module which includes equipment and systems permanently and structurally integrated within a shipping container. In the embodiment shown, a POP brewing system module is comprised of six-sided housing 10 which may be steel or aluminum, and may be either flat or corrugated. In the exemplary embodiment shown, housing 10 is approximately 40 feet long, 8 feet high, and 8 feet wide, conforming to the dimensions of a standard shipping freight container. In other embodiments, housing 10 may range from 8-56 feet in length, 8-9.5 feet in height, and 6-10 feet wide depending on whether an ocean or road shipping freight is used.

In the embodiment shown, POP brewing system 100 is constructed from a standard steel shipping container or intermodal container. In other embodiments, housing 10 may be comprised of any six-sided structure which may be shipped and/or transported with necessary equipment to create POP brewing system.

In the embodiment shown, housing 10 has a finished wall system constructed of drywall, pre-existing shipping container floor and also includes windows. In various other embodiments, housing 10 may include other windows, interior walls, stairs and doors to access the interior of the housing. Further, housing 10 may be insulated and/or refrigerated. In other embodiments, the outside of housing 10 may also be adapted to receive advertising indicia.

In the embodiment shown, module 20 may be comprised of one or more housings operatively connected to create one module for creating wort. Some equipment may span between the two individual housings to create one module. In the exemplary embodiment shown, two housings are stacked upon each other and structurally integrated to house all the necessary equipment and systems. In other embodiments housings may be operatively connected horizontally or in other configurations.

Figure 3:
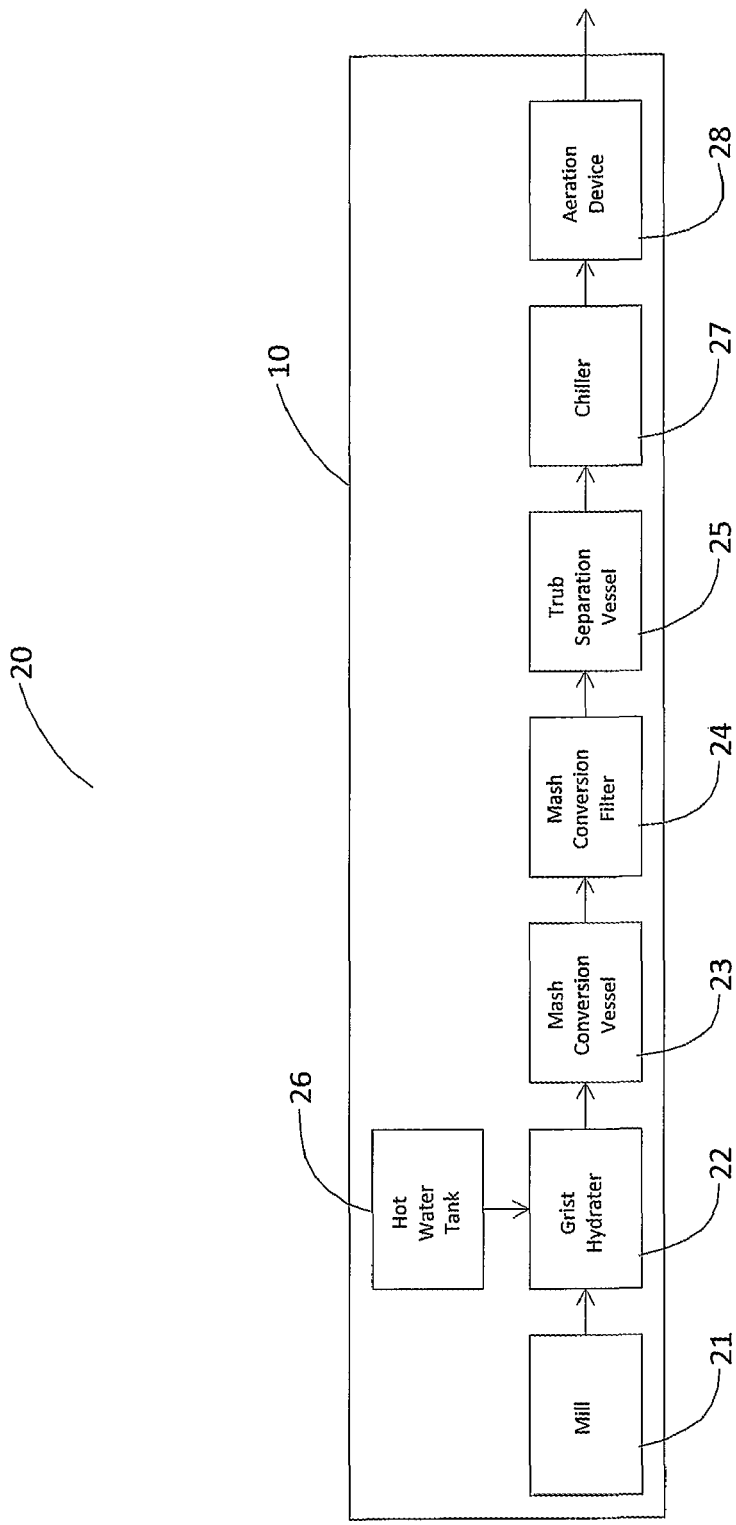
FIG. 3 illustrates an exemplary embodiment of a wort production equipment module.

FIG. 3 illustrates an exemplary embodiment of a layout of the necessary equipment in WPE module 20 which includes mill 21, grist hydrator 22, mash conversion vessel 23, mash conversion filter 24, trub separation vessel 25, hot water tank 26, chiller 27 and aeration device 28. In the embodiment shown, WPE module 20 is comprised of housing 10 and the critical components to convert raw fermentable materials or malt extract into wort ready for fermentation. As shown in the embodiments of FIG. 1 and FIG. 2, WPE module 20 may be comprised of two vertically stacked housings operatively connected with all necessary equipment. In other various embodiments, all equipment and systems for wort production may be structurally integrated with a single housing.

In the exemplary embodiment shown, mill 21 cracks and grinds malted or unmalted raw fermentable material and sprays the raw material into grist hydrator 22 where it is hydrated. Mill 21 may be either a roll or hammer type mill which are standard mills used by those skilled in the art. In the embodiment shown, grist hydrator 22 is a short term storage unit (e.g. a metal hopper) for milled (crushed) material that is processed by mill 21. Grist hydrator 22 adds hot water to the cracked material. In the embodiment shown, hot water is stored in hot water tank 26. The hydrated material is then sent into mash conversion vessel 23 where it is heated and starches are broken down into fermentable sugars, proteins and other derivative known in the art. In other embodiments, a steam boiler may be used to heat hot water tank 26, mash conversion vessel 23 and trub separation vessel 25.

After starch conversion, the material is sent through mash filter 24 where liquid is separated from solids. In the exemplary embodiment, this is where the wort is separated from the mash. The wort is then carried to trub separation vessel 25 where the wort is may be heated on the way or within trub separation vessel 25. Trub separation vessel also removes extra solids from the wort. Hops and other ingredients such as malt extract may be added directly into mash conversion vessel 23 or trub separation vessel 25.

In various alternative embodiments, trub separation vessel 25 may be a whirlpool which is a type of separator that brewers use to separate solids from the wort. In other embodiments, mash conversion vessel 23, mash filter 24, and trub separation vessel 25 may be combined into one system known in the art as a lauter tun.

In the embodiment shown, chiller 27 is a heat exchanger used to cool the wort after leaving trub separation vessel 25. Chiller 27 uses water from a cold water tank. Water used throughout POP brewing system 100 may require some sort of water treatment such as carbon filtration, water softening, RO treatment and/or UV treatment. In the exemplary embodiment shown, the final step in WPE module 20 is aerating the cold wort before it leaves WPE module 20. Aeration device 28 is typically comprised of oxygen tanks or compressed air and supplies air to the cold wort; the aeration process may be fully automated or manually controlled. In alternative embodiments, the aeration process may be done directly in fermentation/maturation vessel 32 (shown in FIG. 5).

Figure 4:
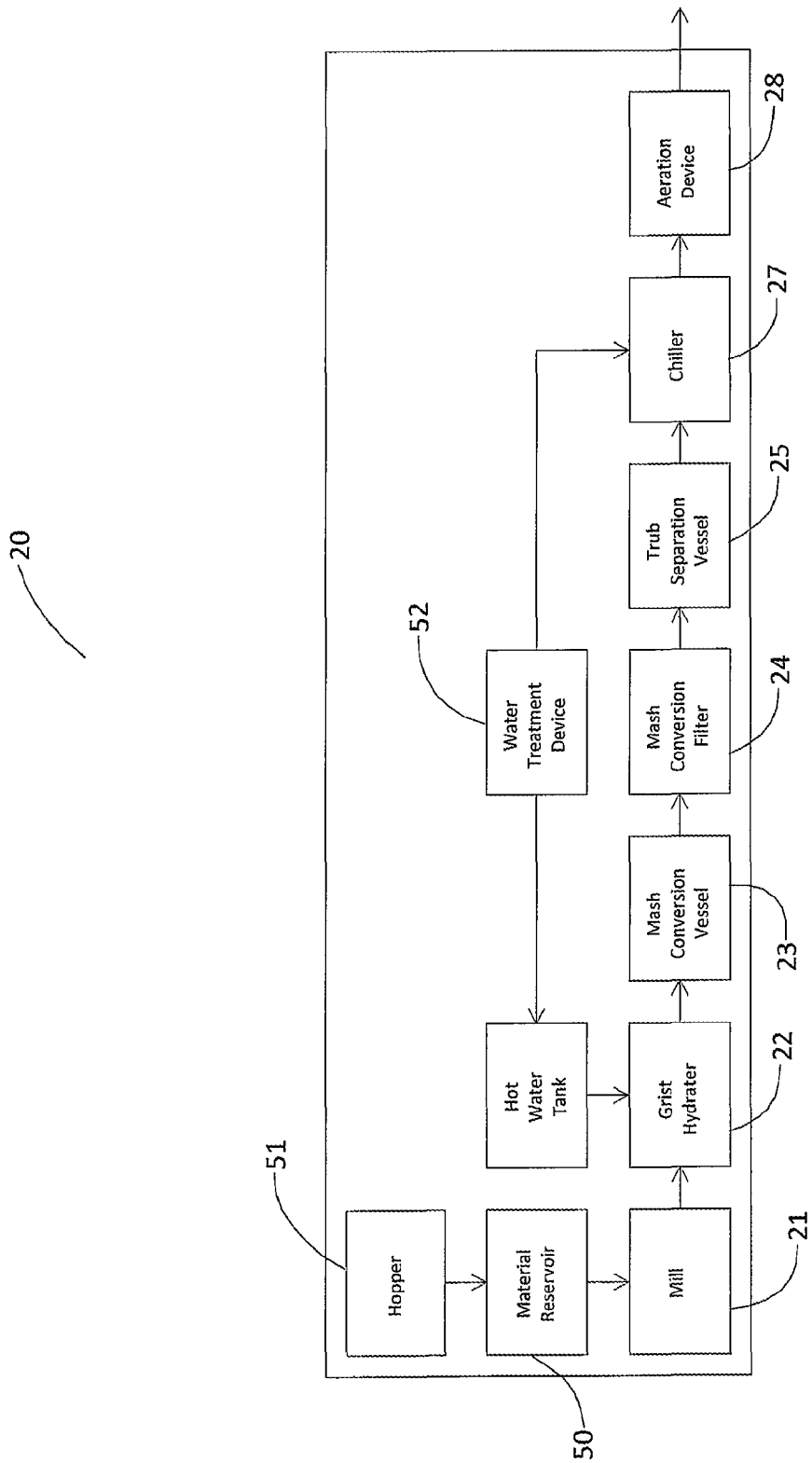
FIG. 4 illustrates an alternative exemplary embodiment of a wort production equipment module having optional equipment and systems.

FIG. 4 illustrates an alternative exemplary embodiment of a WPE module 20. In the embodiment shown, WPE module 20 may include optional or additional components such as material reservoir 50 which in the present embodiment may be a suspended sack, or super sack, temporarily affixed with an overhead support structure such as a hook, but may be in any type container. In other embodiments, WPE module 20 may contain more than one material reservoir. In the embodiment shown, material reservoir 50 may be a 2,000 pound sack of malted barley, or any other malted grain known in the art for making beer.

In the embodiment shown, WPE module 20 may include hopper 51 which is used to funnel raw materials from material reservoir 50 into mill 21. In other embodiments, raw material may be fed directly into mill 21. Further, in the exemplary embodiment shown, WPE module 20 may include water treatment device 52 which may include but is not limited to carbon filtration, water softening, reverse osmosis (RO) treatment, ultraviolet (UV) treatment and any combination thereof. In other embodiments, WPE module 20 may be insulated with doors and windows, vents and lifting devices for bringing up raw materials.

Figure 5:
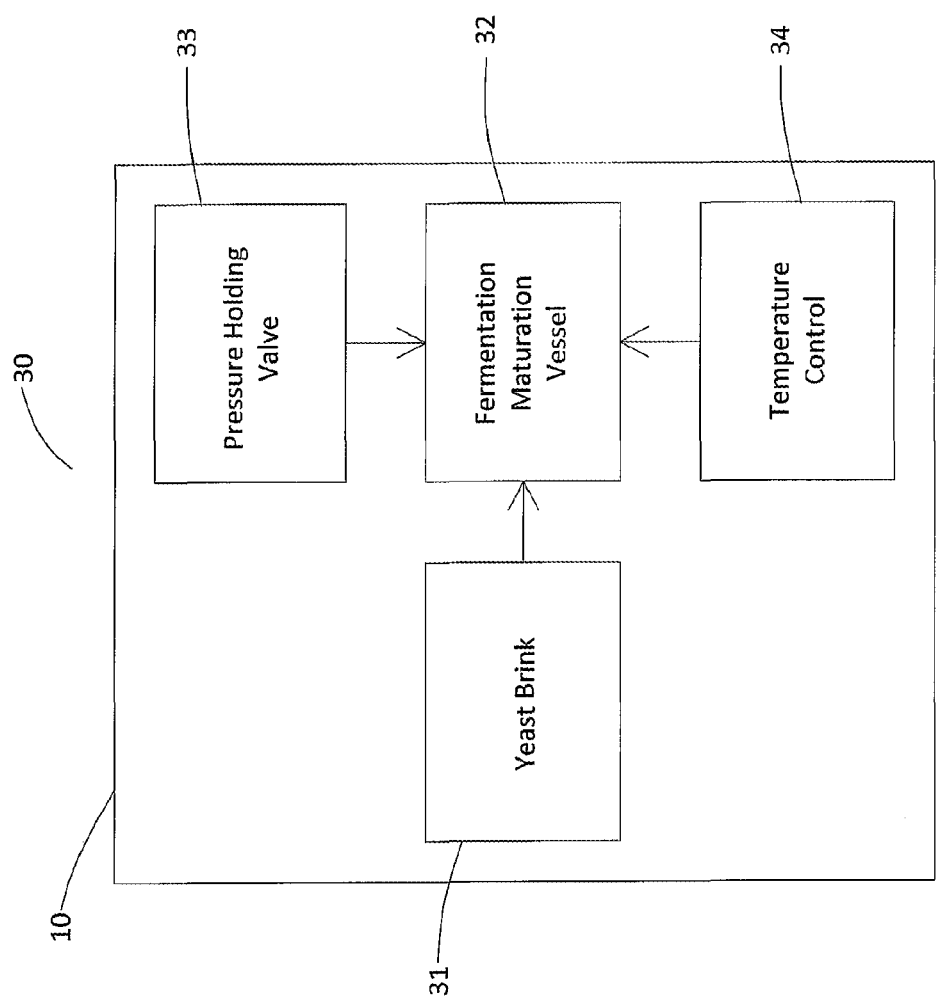
FIG. 5 illustrates an exemplary embodiment of a fermentation maturation equipment module.

FIG. 5 illustrates an exemplary embodiment of fermentation/maturation equipment (FME) module 30 where the cold aerated wort is fermented into a final brewed product. FME module 30 includes the critical components yeast brink 31, fermentation/maturation vessel 32, pressure holding valve 33 and temperature control component 34. In the embodiment shown, yeast brink 31 is used to store yeast for fermenting the wort. Yeast may be introduced directly into fermentation/maturation vessel 32 or into the line where the wort enters fermentation/maturation vessel 32. In the embodiment shown, FME module 30 further includes fermentation/maturation vessel 32 where fermentation takes places under a controlled temperature and pressure. In other embodiments, FEM module may contain more or fewer fermentation/maturation vessels. In the embodiment shown, pressure holding valve 33 maintains a desired pressure within fermentation/maturation vessel 32 and temperature control equipment 34 is used to spray cold water or glycol chiller around fermentation/maturation vessel 32.

Figure 6:
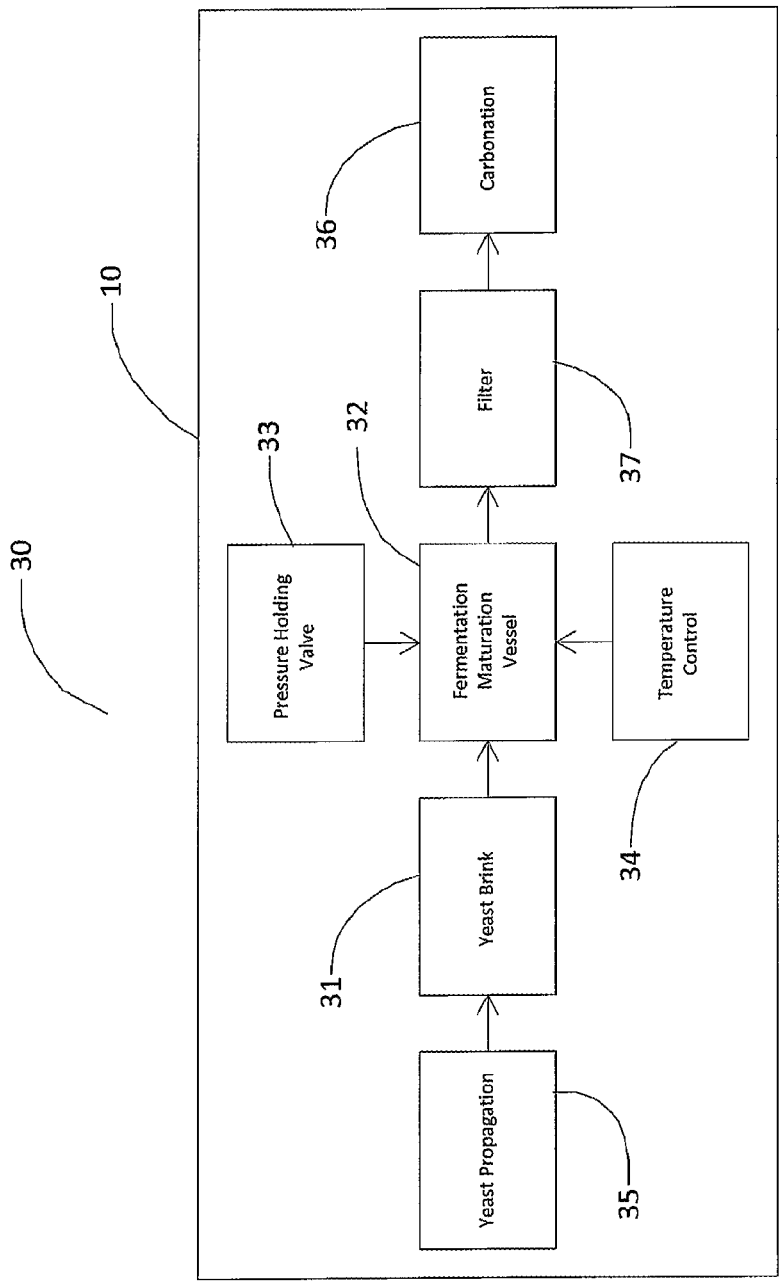
FIG. 6 illustrates an alternative exemplary embodiment of a fermentation maturation equipment module having optional equipment and systems.

FIG. 6 illustrates an alternative exemplary embodiment of a FME module 30. In the embodiment shown, FME module 30 may include optional or additional equipment and systems such as yeast propagation component 35 where yeast may be grown or propagated on site. Further FME module 30 may include carbonation system 36 which adds carbonation to the beverage after leaving fermentation/maturation vessel 32. In various other embodiments, carbonation is added to the fermented liquid, and may only have carbonation generated by the fermenting process.

In the embodiment shown, FME module 30 may also include filter 37 which is operatively connected to fermentation/maturation vessel 32 and which is used specifically to filter additional sediment or particles from the brewed liquid. Filter 37 may be any filter known to those skilled in the art including but not limited to coarse, fine, centrifuge, depth, kenall, de filter, plate and frame, sterile filters and combinations thereof.

In the embodiment shown, FME module 30 further includes blending component 38 which is used to blend additional water into the beverage leaving fermentation/maturation vessel 32. Blending component 38 may also include a deaeration system which removes the oxygen from the water before it is blended with the brewed beverage.

In other embodiments, FME module 30 may include utility/support system which is comprised of all the support and maintenance systems equipment including but not limited to water treatment systems, steam boilers, water deaeration systems, cleaning-in-place (CIP) and any combination thereof. Utility/support system will provide all the typical maintenance and support systems needed to operate a brewery. In other embodiments, utility/support components may be housed in a separate module and operatively connected to the other brewing modules.

Figure 7:
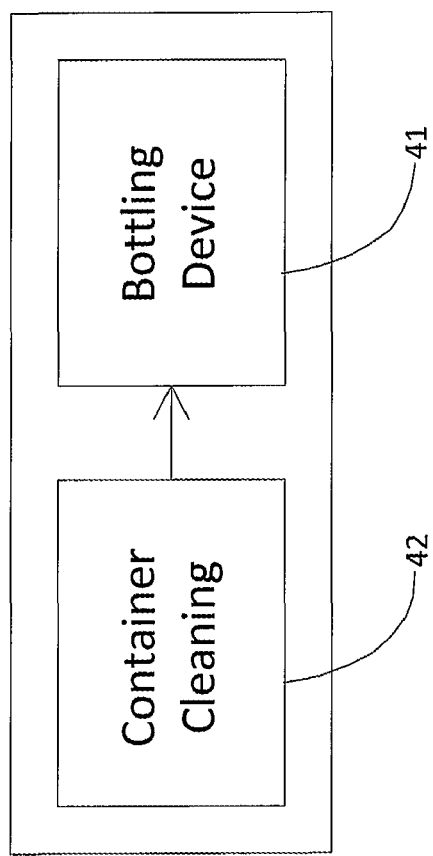
FIG. 7 illustrates an exemplary embodiment of a packaging and storage module.

FIG. 7 illustrates an exemplary embodiment packaging module 40. After the beverage is brewed, it enters packaging module 40 where it may be packaged, stored and shipped. Packaging module 40 includes bottling device 41 which fills and prepares bottles, cans, kegs and other containers for shipping and consumption purposes. Packaging module 40 may also have a refrigerator storage compartment and loading doors. In the embodiment shown, packaging module 40 further includes at least one container cleaning system 42 for cleaning and sterilizing bottles, cans, and/or kegs. In other embodiments, packaging module 40 may include a labeling device for labeling cans and bottles.

Figure 8B:
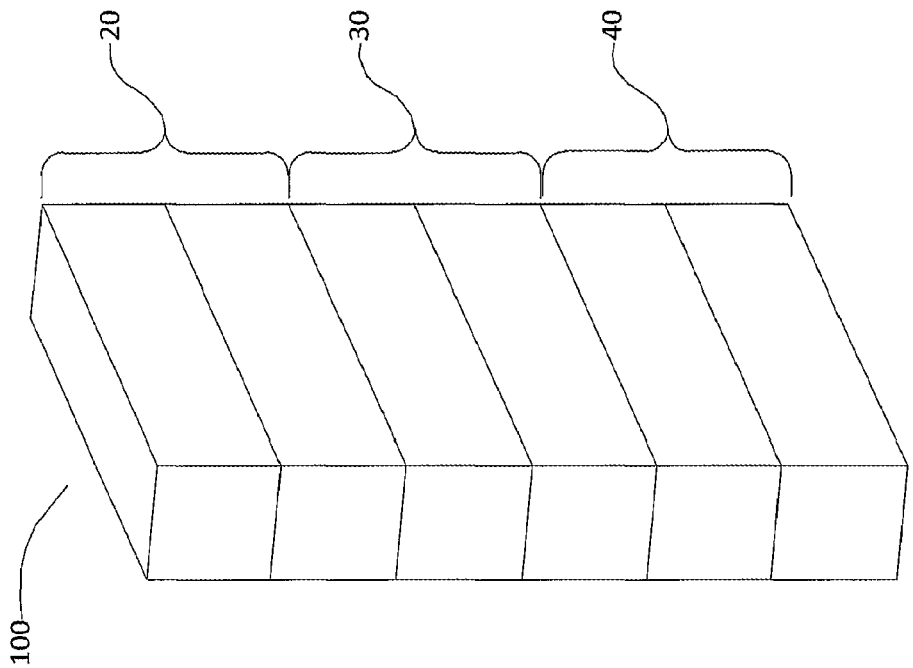
FIGS. 8a and 8b illustrates an exemplary embodiments of a vertically configured point-of-production brewing system which are designed to use a small installation footprint.
Figure 8A:
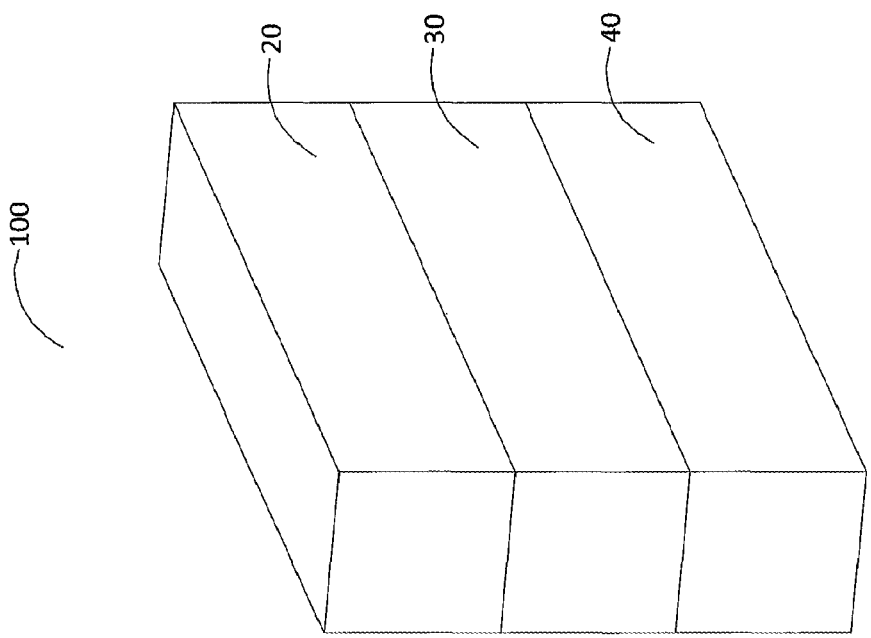

FIGS. 8a and 8b illustrate exemplary embodiments of POP brewing system 100 in a vertical configuration and are capable of producing beer for on-site storage and consumption. As shown in the embodiment, a vertical arrangement of modules 20, 30 and 40 decreases the foot print and area need to create a brewing system. In FIG. 8a, each module is comprised of a single housing, and each module is operatively connected to the other for full production. FIG. 8b illustrates an exemplary embodiment where each module may be comprised of two housing operatively connected to create a brewing module. In the exemplary embodiments shown, POP brewing system 100 in the vertical configuration may be placed near an existing structure with using only minimum space. Further, POP brewing system 100 is capable of outputting eighteen different beer types in 15 days. In other embodiments, more modules may be added to output more beverages.

Figure 9B:
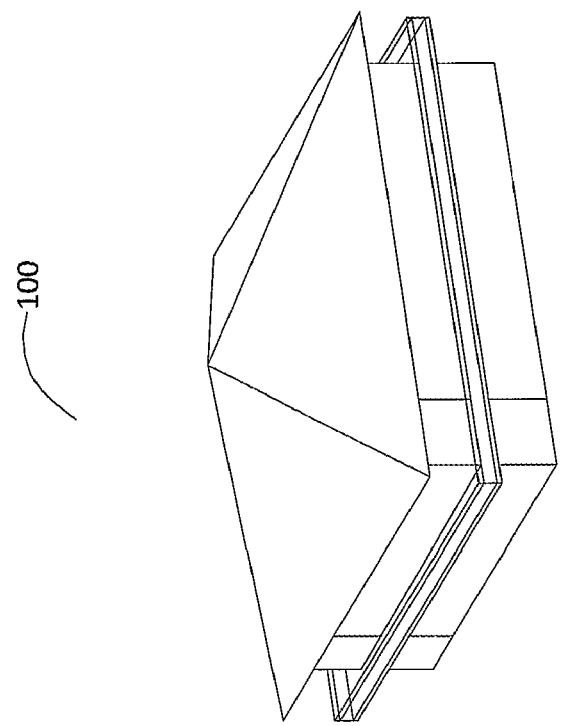
FIGS. 9a and 9b illustrate exemplary embodiments of a point-of-production brewing system which is configured horizontally to create a building-like structure.
Figure 9A:
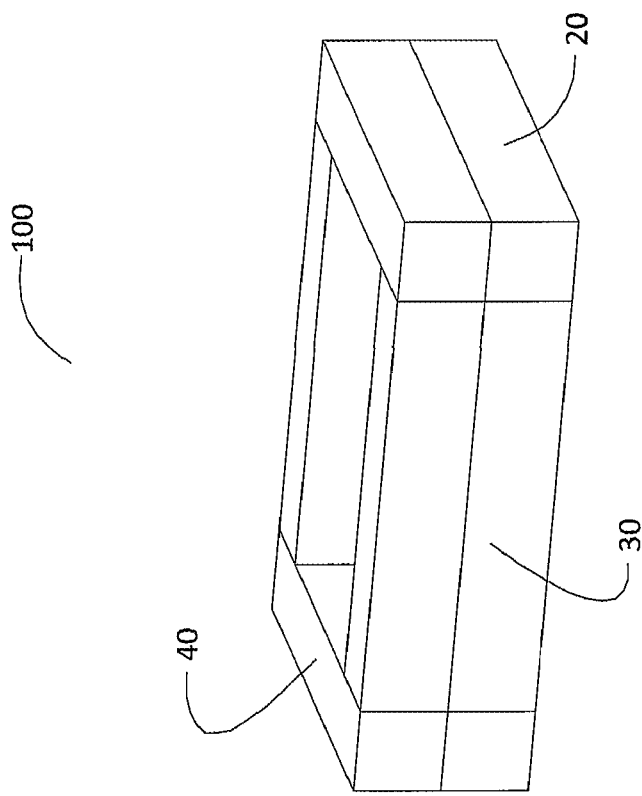

FIGS. 9a and 9b illustrate exemplary embodiments of POP brewing system 100 which is configured horizontally to create a building like structure. In the embodiment shown, WPE module 20, FME module 30, and packaging module 40 may be configured in a square like arrangement to create an open inner area which may be used for a restaurant, pub, beer garden, storage or other operations. In the embodiment shown, a roof or canopy may be added to protect the entire structure from the elements.

In other embodiments, POP brewing modules may contain a washroom which may use post treated water from the brewing operation. This arrangement will allow for a usable restroom in remote areas where typical water lines are not attached POP brewing system 100.

What is claimed is:
1. At least one point of use brewing system comprised of:
at least one wort production equipment (WPE) module comprised of at least one six-sided housing container and a plurality of structurally integrated wort production equipment components including:
at least one mill;
at least one grist hydrator;
at least one mash conversion vessel;
at least one mash filter;
at least one trub separation vessel;
at least one hot liquid tank;
at least one chiller; and
at least one aeration device;
at least one fermentation maturation equipment (FME) module comprised of at least one six-sided housing container and a plurality of structurally integrated fermentation equipment components to carbonate a fermentable sugar solution including:
at least one yeast bank;
at least one fermentation/maturation vessel;
at least one pressure holding valve;
at least one temperature control component; and
at least one blending system, the at least one blending system includes a deaeration system; and
at least one packaging module having at least one bottling device and at least one container cleaning system within at least one six-sided housing container.
2. The brewing system of claim 1 wherein said WPE module further includes at least one material reservoir for storing raw material.
3. The brewing system of claim 2 wherein said at least one material reservoir is a super sack.
4. The brewing system of claim 1 wherein said WPE module further includes at least one hopper operatively connected to said at least one mill.
5. The brewing system of claim 1 wherein said mill is a roll mill.
6. The brewing system of claim 1 wherein said mill is a hammer mill.
7. The brewing system of claim 1 wherein said at least one six-sided housing is a standard shipping container being 40 feet long, 8 feet tall, and 8 feet wide.
8. The brewing system of claim 1 wherein said trub conversion vessel is a whirlpool separation device.
9. The brewing system of claim 1 wherein said FME module further includes a yeast propagation component.
10. The brewing system of claim 1 wherein said FME module further includes a carbonation system.
11. The brewing system of claim 1 wherein said FME module further includes at least one filter including but not limited to coarse, fine, centrifuge, depth, kenall, de filter, plate and frame, sterile filters and combinations thereof.
12. The brewing system of claim 1 further including a structurally integrated utility module comprised of support equipment including but not limited to a water treatment system, steam boiler, water deaeration system, cleaning-in-place system and combinations thereof.
13. The brewing system of claim 1 wherein said at least one six-sided housing is insulated.
14. The brewing system of claim 1 wherein said at least one six-sided housing is refrigerated.
15. The brewing system of claim 1 wherein said at least one six-sided housing has an outside wall capable of receiving indicia.
16. At least one point of use brewing system comprised of:
at least one wort production equipment (WPE) module comprised of at least one six-sided housing container and a plurality of structurally integrated wort production equipment components including:
at least one mill;

at least one grist hydrator;
at least one mash conversion vessel;
at least one mash filter;
at least one trub separation vessel;
at least one hot liquid tank;
at least one chiller;
at least one aeration device; and
a water treatment system including but not limited to carbon filtration, water softening, reverse osmosis treatment, ultraviolet treatment and any combination thereof;
at least one fermentation maturation equipment (FME) module comprised of at least one six-sided housing container and a plurality of structurally integrated fermentation equipment components to carbonate a fermentable sugar solution including:
at least one yeast bank;
at least one fermentation/maturation vessel;
at least one pressure holding valve;
at least one temperature control component; and
at least one packaging module having at least one bottling device and at least one container cleaning system within at least one six-sided housing container.

* * * * *